United States Patent

Cheng

[11] Patent Number: 6,024,687
[45] Date of Patent: Feb. 15, 2000

[54] CENTRIFUGE ROTOR LOCK

[75] Inventor: David Wai-Wing Cheng, Belmont, Calif.

[73] Assignee: Beckman Coulter, Inc., Fullerton, Calif.

[21] Appl. No.: 09/074,478

[22] Filed: May 6, 1998

[51] Int. Cl.[7] ........................................... B04B 9/00
[52] U.S. Cl. .................................. 494/84; 464/77
[58] Field of Search .............................. 494/7, 12, 16–21, 494/31, 33, 84; 464/70, 78, 81–83, 77, 92, 182; 422/72

[56] References Cited

U.S. PATENT DOCUMENTS

| | | | |
|---|---|---|---|
| 1,997,021 | 4/1935 | Spase | 464/77 |
| 2,868,001 | 1/1959 | Russell | 464/77 |
| 3,676,723 | 7/1972 | Drucker | 494/16 |
| 3,938,354 | 2/1976 | Lehman | 494/84 |
| 3,961,745 | 6/1976 | Wright | 494/84 |
| 3,984,998 | 10/1976 | Rogakos et al. . | |
| 4,101,070 | 7/1978 | Hoare et al. | 494/84 |
| 4,753,630 | 6/1988 | Romanauskas | 494/9 |
| 4,753,631 | 6/1988 | Romanauskas | 494/84 |
| 4,776,834 | 10/1988 | Muller et al. | 494/84 |
| 4,890,947 | 1/1990 | Williams et al. . | |
| 4,897,075 | 1/1990 | Sharples | 494/84 |
| 5,342,282 | 8/1994 | Letourneur | 494/16 |
| 5,344,380 | 9/1994 | Chern et al. | 494/16 |
| 5,362,293 | 11/1994 | Romanauskas | 494/84 |
| 5,443,438 | 8/1995 | Wright | 494/84 |
| 5,456,534 | 10/1995 | Krzywdziak | 464/77 |
| 5,456,653 | 10/1995 | Wright | 494/84 |
| 5,658,231 | 8/1997 | Schmitt et al. | 494/12 |
| 5,681,257 | 10/1997 | Letourneur | 494/12 |

*Primary Examiner*—Charles E. Cooley
*Attorney, Agent, or Firm*—William H. May; Margaret A. Kivinski

[57] ABSTRACT

A centrifuge rotor locking apparatus includes a C-shaped annular member for a snap-fit engagement about a drive hub. The member comprises first and second contacting segments and a third non-contacting segment. Centrifugation causes the contacting segments to flex outwardly and come into contact with the interior wall of the drive hole of a mounted rotor. The unbalanced mass distribution of the annular member causes the member to tend to slide off the drive hub. This further separates the contacting segments, thus increasing the locking effect of the annular member/drive hub assembly to the rotor as the member is wedged in place between rotor and drive hub.

17 Claims, 6 Drawing Sheets

CENTRIFUGE ROTOR LOCK

TECHNICAL FIELD OF THE INVENTION

The present invention relates generally to centrifuges, and the like, and more specifically to a locking apparatus for a centrifuge rotor.

BACKGROUND ART

Centrifuge equipment is used to separate biological and chemical samples into their constituent components based upon differences in their masses (or molecular weights). This is accomplished by placing the samples in appropriate containers and exposing them to centrifugal force. A centrifuge rotor is a relatively massive component of a centrifugal device which is adapted to expose the samples contained therein to such forces. Typically, a rotor is spun up to very high rotational speeds in order to achieve the centrifugal forces needed for a particular separation experiment. It is therefore critical that the rotor is securely coupled to the drive shaft which transmits a drive torque to the rotor.

The availability of a variety of rotors increases the utility of the centrifugal equipment in biological and chemical separations. For a selected separation process, a rotor is chosen according to the sample of interest and the physical characteristics of the rotor. The centrifuge must be adapted to interchangeably mount any of a variety of rotors onto a drive shaft. Conventionally, a centrifuge rotor is connected to the drive system by a drive hub. The hub is fixed to a drive shaft of the drive system and is releasably coupled to the rotor. Numerous approaches have been developed for easy coupling and decoupling of a rotor to and from its drive shaft.

For example, U.S. Pat. No. 4,753,630 discloses a rotor locking mechanism which lockably engages the rotor at a protrusion on the underside thereof. The drive spindle is received in the locking mechanism, thereby imparting a driving force to the rotor. The material constituting the locking mechanism and the design itself are such that the mechanism will fail when a rotational speed which could damage the rotor is attained. Failure of the mechanism disengages the drive spindle from the rotor in that situation, thus saving the rotor from injury.

U.S. Pat. No. 4,890,947 describes a rotor having a mounting adapter. The mounting adapter includes an internal chamber into which is received a connecting member. The rotor/adapter is coupled to the drive spindle by screwing down the connecting member, causing it to press down upon the lower surface of the internal chamber thus securing the adapter to the drive spindle. Conversely, the rotor/adapter is decoupled from the drive shaft by unscrewing the connecting member, causing it to push up against an upper surface of the interior chamber thus lifting the adapter from the drive spindle.

U.S. Pat. No. 5,362,293 discloses a rotor having a clutch mechanism which fits about the circumference of the drive spindle. The clutch comprises two sets of pivotal elements disposed about and in frictional contact with the circumference of the spindle. When the spindle is spun in a clockwise direction, the frictional contact causes one set of pivotal elements to be wedged against the spindle. This wedging action increases the frictional engagement between the clutch and spindle, thereby driving the rotor via the clutch.

U.S. Pat. No. 5,658,231 describes a centrifugal chuck having finger-like members disposed about its periphery for gripping the outer circumference at the base of a rotor. The finger-like members are pivotally mounted to pivot in a radial direction either toward or away from the rotor. The center of mass of each finger-like member is positioned below the pivot point so that the presence of a centrifugal force urges the fingers toward the rotor, thus securing the rotor in place.

These prior art approaches involve mechanical designs which are costly to produce and which are subject to failure over time. In other designs, the rotor is provided with an axial bore along its entire length. A hub fixed to the drive shaft and having outwardly projecting prongs mate with corresponding recesses in the axial bore of the rotor, thus locking the rotor in a fixed position relative to the drive shaft. A tie-down stem is inserted through the bore from the top of the rotor and is coupled to the drive shaft, thus securing the rotor in place. However, the formation of an axial bore greatly weakens the structural integrity of the rotor, introducing stresses at the rotor/bore interface which limit the rotor's working life or limit the maximum speed at which the rotor can operate.

A need therefore exists for providing a mechanically simple locking device which can provide a secure attachment of a centrifuge rotor to its drive system with minimal impact on the structural integrity of the rotor. It is desirable that such a locking device have minimal impact on the longevity of the rotor and on its operating speed.

SUMMARY OF THE INVENTION

A centrifuge rotor locking apparatus includes an annular member having an axially directed gap, which is sufficiently wide so as to allow a snap-fit engagement of the annular member to a portion of a drive hub that is received in the rotor, placing the annular member between the drive hub and the rotor. The annular member includes first and second contacting outer surfaces and a non-contacting outer surface disposed between the first and second surfaces. The contacting surfaces are outwardly bowed by centrifugal force, being raised relative to the non-contacting surface during high speed rotation.

During centrifugation, the contacting surfaces become locked between the drive hub and the rotor, thus locking the rotor to the drive hub. A locking pin couples the annular member to the drive hub to prevent slipping of the annular member.

The use of the locking member eliminates the need to form a drive hole through the full length of the rotor body, requiring only a hole sufficiently deep to receive the drive hub/locking member assembly. This minimizes the rotor/bore interface which in turn limits the stress to which the rotor is subjected. The design of the locking member in accordance with the present invention permits existing rotor assemblies to be used in newer instruments which incorporate the hub/locking member of the present invention.

BEST MODE FOR CARRYING OUT THE INVENTION

Figure 1A:
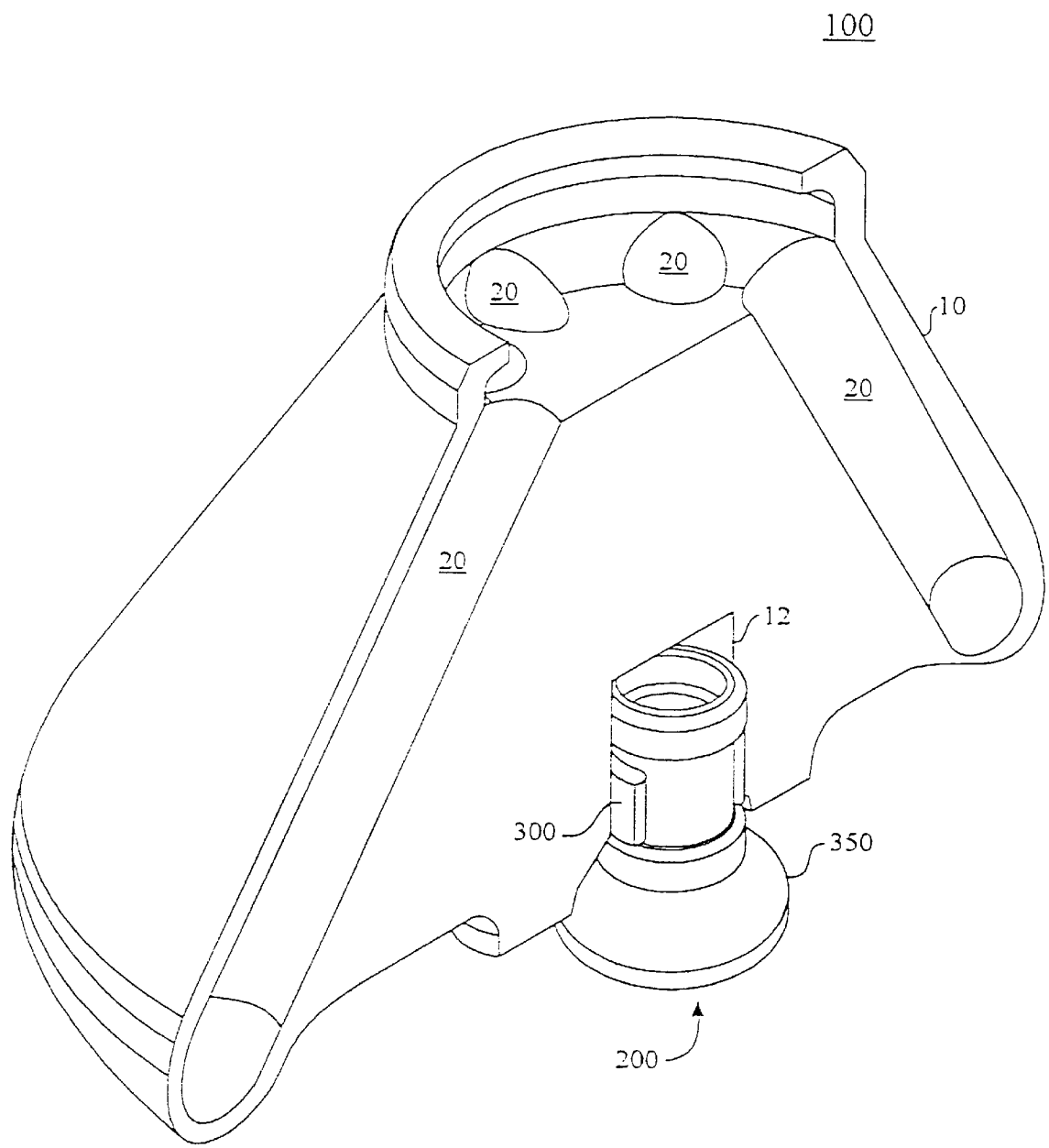
FIGS. 1A and 1B show a rotor assembly utilizing the locking apparatus of the present invention.
Figure 1B:
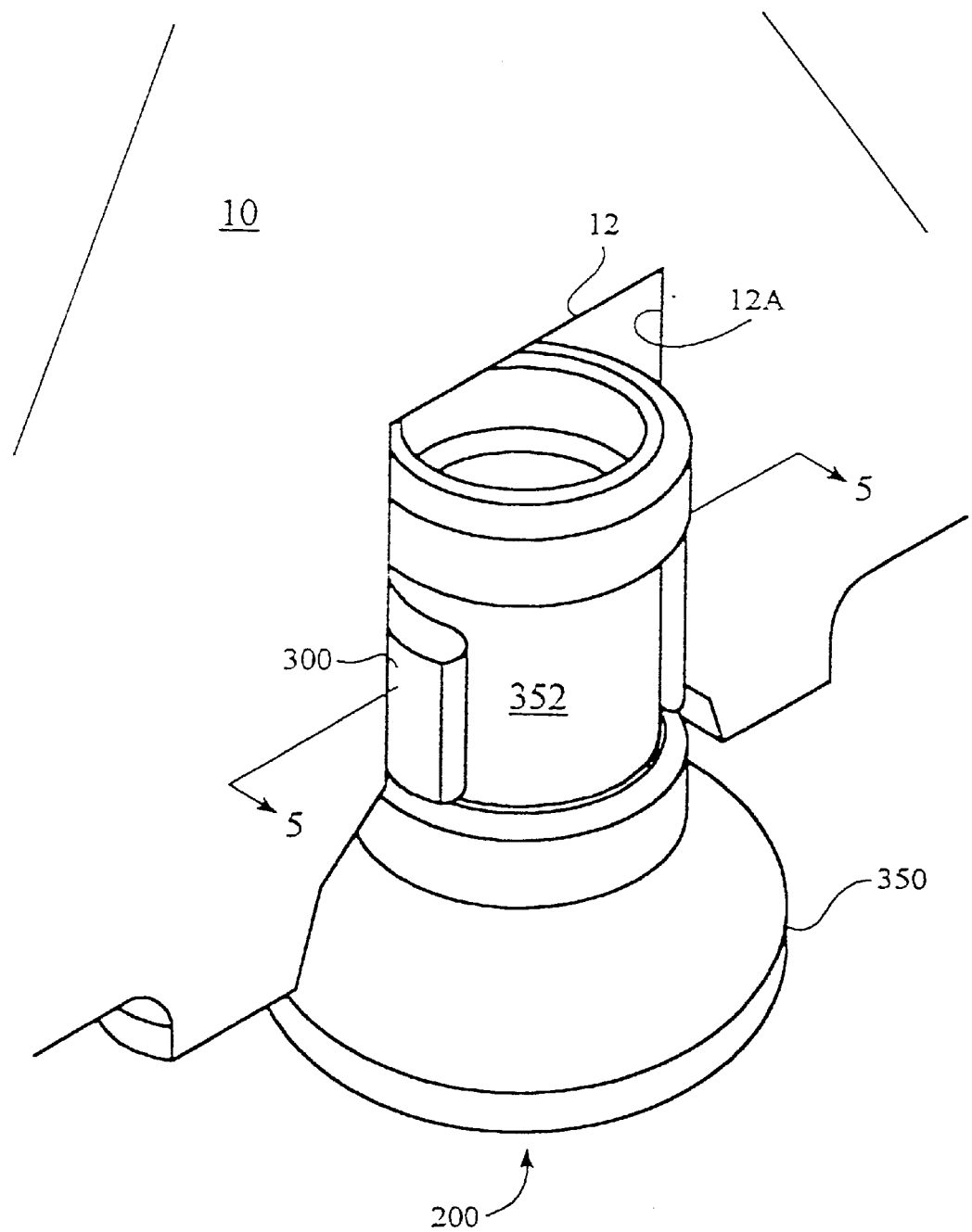

Referring to FIGS. 1A and 1B, a rotor assembly 100 in accordance with the invention comprises a rotor 10 having a plurality of chambers 20 for receiving sample containers (not shown) for centrifugation. Rotor 10 includes an axially disposed drive hole (bore) 12 by which the rotor is mounted to a drive shaft assembly 200. Drive hole 12 is shown formed through only a short distance into the body of rotor 10, a distance sufficient to receive hub assembly 200.

Figure 2:
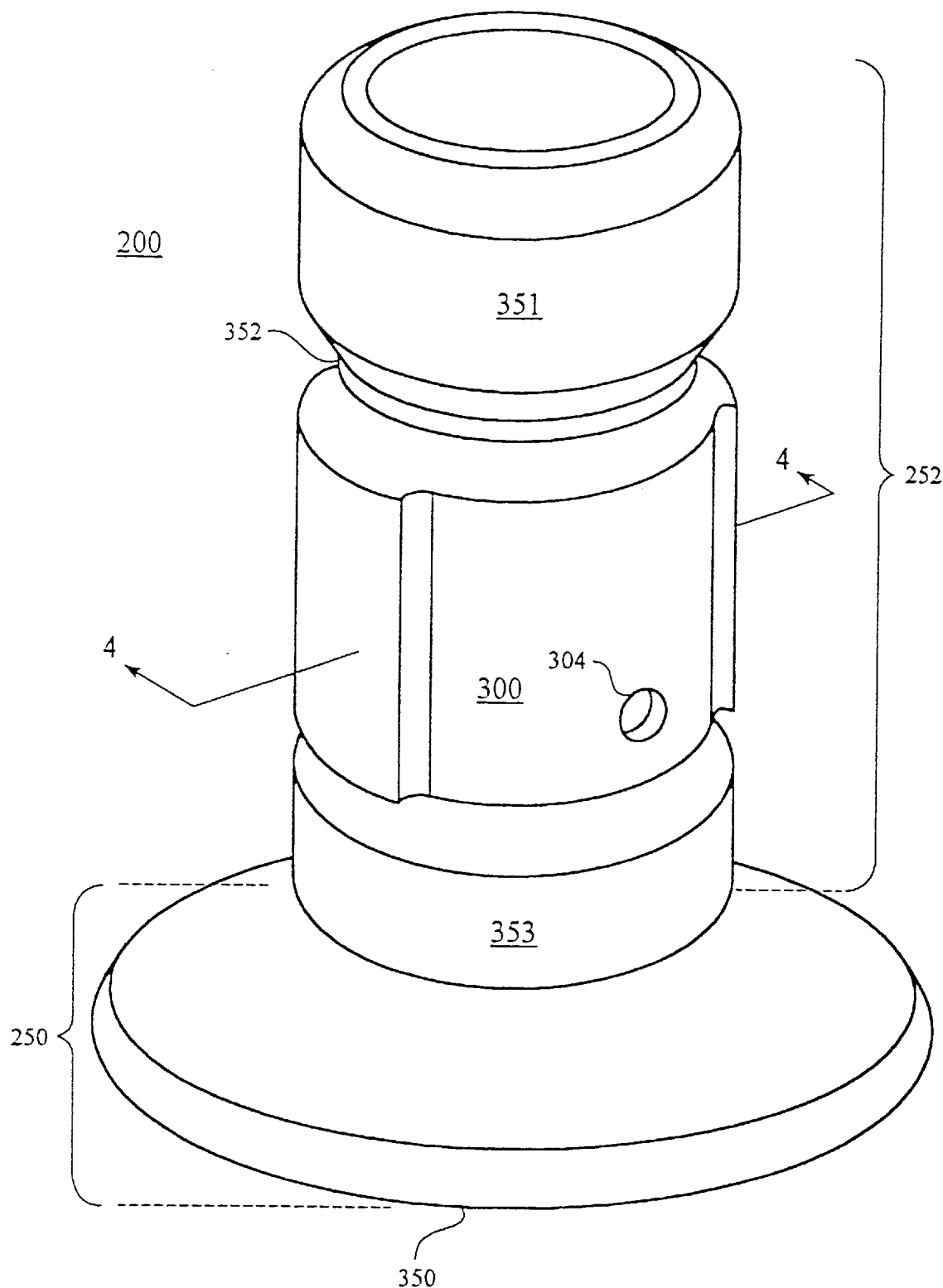
FIGS. 2 and 3 illustrate the locking apparatus of the present invention.
Figure 3:
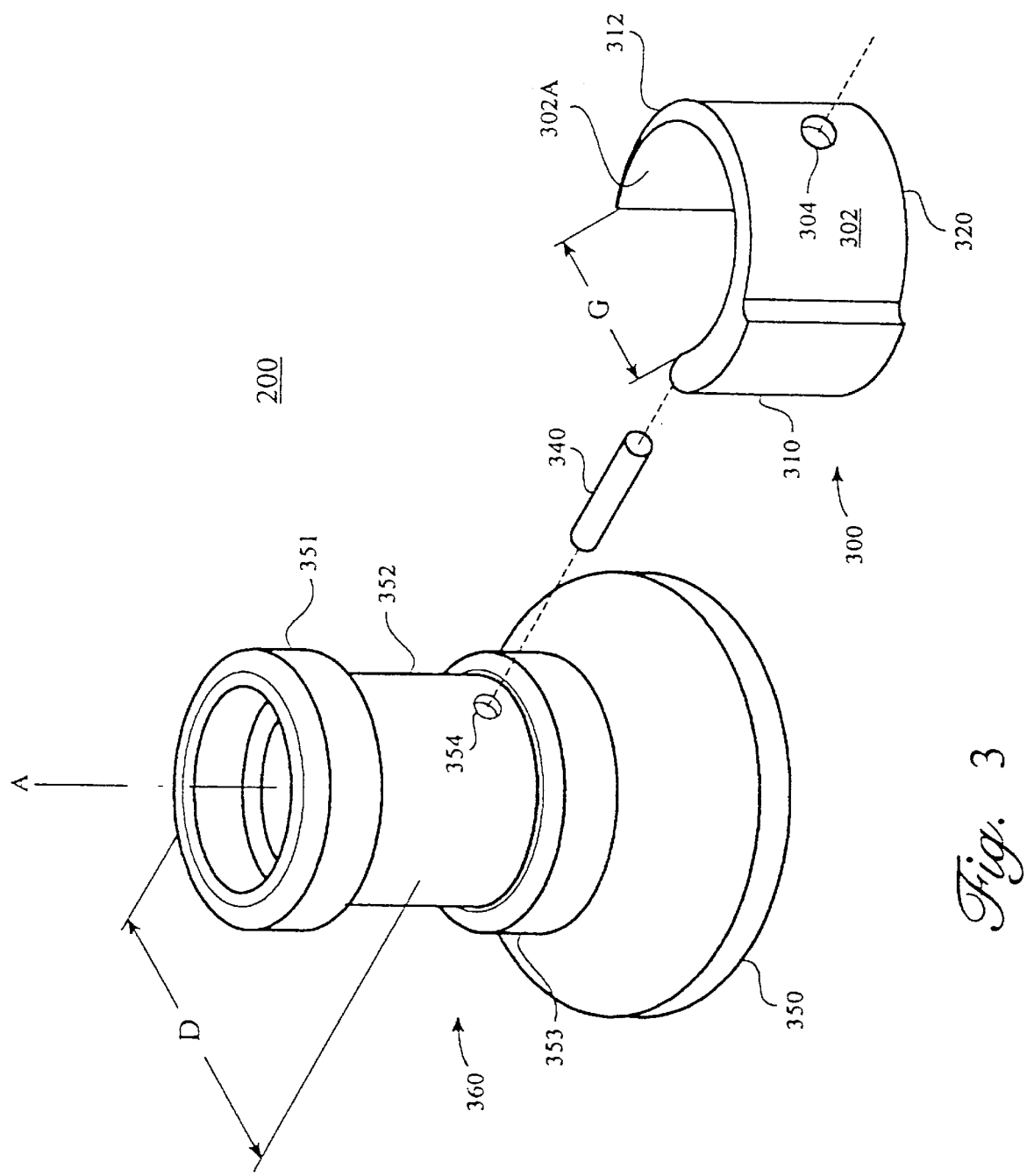
Figure 4:
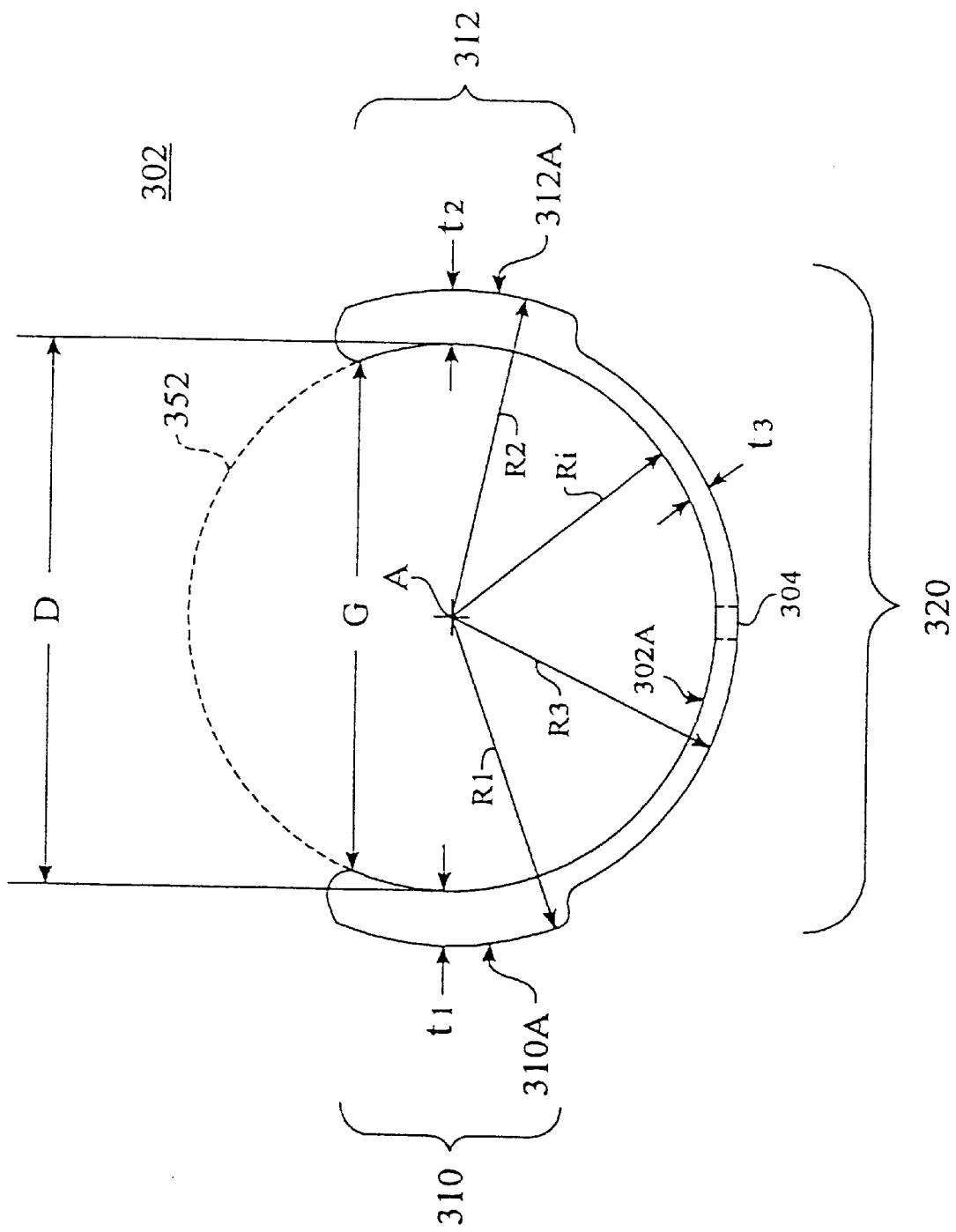
FIG. 4 is a plan view of the locking apparatus, taken along view line 4—4 shown in FIG. 2.

As can be seen in FIGS. 2–4, hub assembly 200 comprises a cylindrical portion 252 and a base portion 250. In operation, hub assembly 200 is received in drive hole 12 of rotor 10. The exploded view of hub assembly 200 illustrated in FIG. 3 shows a hub sub-assembly 360 comprising a base 350 and a neck portion 352. Base 350 is typically coupled to the shaft of a drive motor (not shown) to transfer torque from the drive motor to rotor 10, thus providing the motive force for centrifugation. Extending from base 350 is neck portion 352 which participates in the locking action of drive hub assembly 200 to rotor 10 as will be discussed below. Neck portion 352 is flanked above and below by flange members 351 and 353 respectively. An opening 354 is formed into the body of neck portion 352.

The exploded view of FIG. 3 also shows a locking member sub-assembly 300 comprising an annular member 302. Annular member 302 has a generally cylindrical shape with a gap formed along a direction parallel to a longitudinal spin axis A of hub subassembly 360. Annular member 302 therefore has a C-shaped plan profile as evidenced in the plan view provided in FIG. 4. Annular member 302 includes an opening 304 aligned with opening 354 formed in neck portion 352.

The gap (opening) of annular member 302 has a measurement G which is smaller than a diameter D of the mid-section of neck portion 352 between flange members 351 and 353 (shown in phantom in FIG. 4). The inside diameter of the annular member is slightly larger than diameter D of the mid-section of neck portion 352. The resiliency of the material used to manufacture the annular member provides a snap-fit engagement of the annular member to neck portion 352 between flange members 351 and 353. In the preferred embodiment, stainless steel is used for its non-corrosive properties. This is especially important where spillage of sample occurs. It is also contemplated that various plastic compounds can be used instead of stainless steel.

Annular member 302 is portioned into first and second segments 310, 312, which are separated by a third segment 320. Preferably, segments 310 and 312 are in diametrically opposed relation, as can be seen in FIG. 4. Segments 310 and 312 have outer surfaces 310A and 312A respectively which are raised relative to outer surface 320A of segment 320. The radial distance R3 from center A to outer surface 320A is less than the corresponding radial distances R1 and R2. Interior surface 302A of annular member 302 has a substantially constant radial measurement Ri therearound to provide a proper fit of the annular member about neck portion 352. Consequently, the thickness t1 of segment 310 and the thickness t2 of segment 312 each is greater than the thickness t3 of segment 320.

Figure 5B:
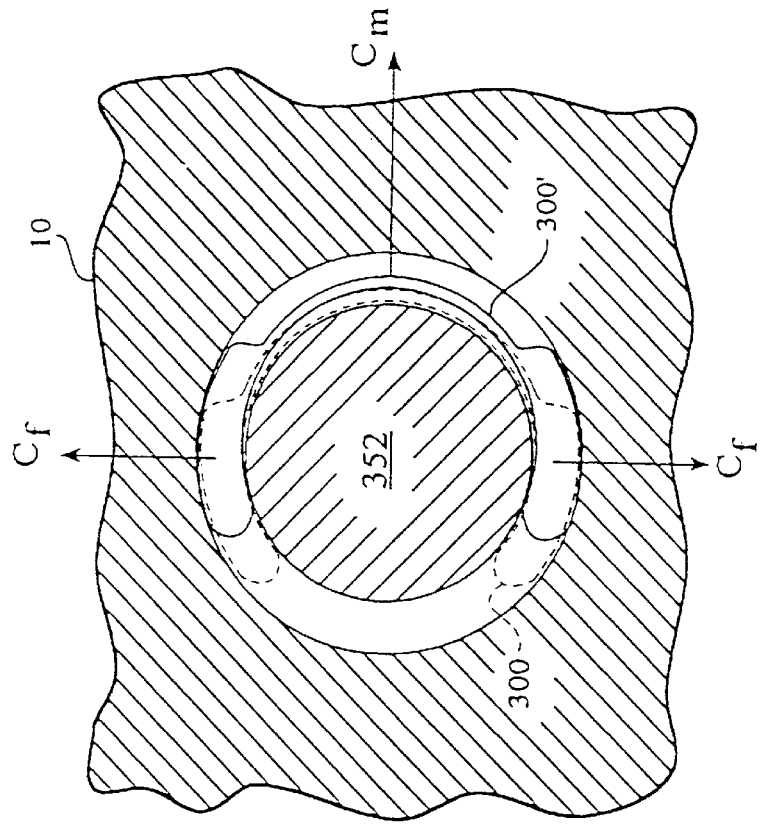
FIGS. 5A and 5B are cutaway views taken along view line 5—5 (FIG. 1B) showing the locking apparatus in the resting state and the various forces which act on the locking apparatus during centrifugation.
Figure 5A:
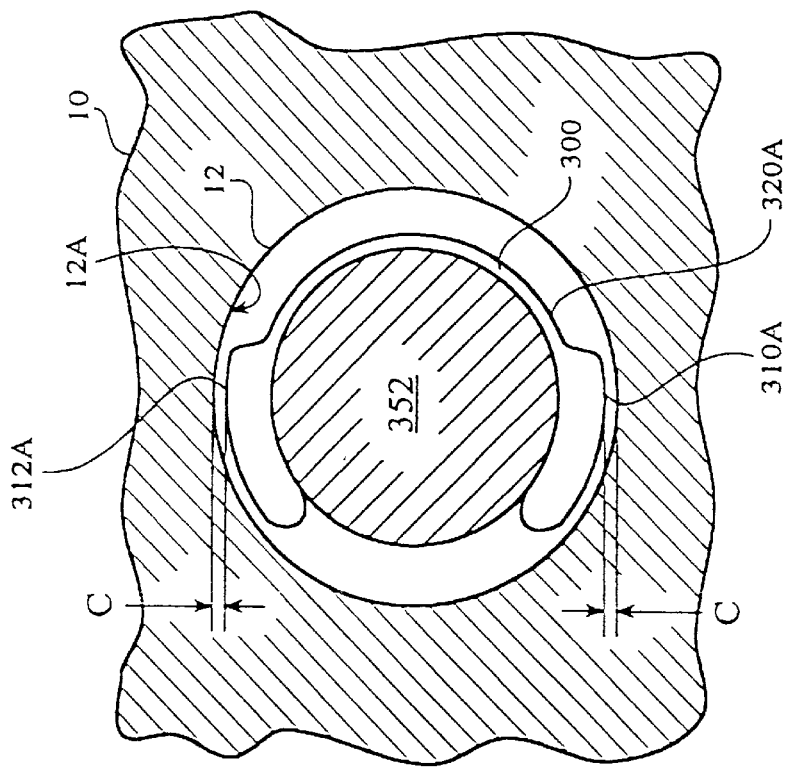

Referring to FIG. 5A, a top view of the rotor assembly of FIG. 1B showing in exaggerated detail the assembly in the resting non-spinning condition. The view is taken along view line 5—5 of FIG. 1B through drive hole 12, showing a portion of the body of rotor 10. It can be seen that contacting surfaces 310A and 312A of locking sub-assembly 300 are separated from the interior wall 12A of the drive hole. The view in FIG. 5A shows the separation C of contacting surfaces 310A and 312A from interior wall 12A with exaggerated dimensions for explanatory purposes. Typically, the separation is on the order of 0.0035 to 0.005 of an inch.

Referring to FIGS. 5A and 5B, recall that locking sub-assembly 300 is coupled to neck portion 352 by locking pin 340. Consequently, when the drive shaft (and hence hub sub-assembly 360) starts to spin, locking sub-assembly 300 also will spin. The locking sub-assembly will expand (as shown by position 300' in FIG. 5B) so that contacting surfaces 310A and 312A will push on interior wall 12A of the drive hole of rotor 10. When there is sufficient expansion of the lock, the contacting surfaces will become locked between neck portion 352 of the hub sub-assembly and interior wall 12A of the rotor so that the locking sub-assembly effectively locks the rotor to the hub sub-assembly. Locking pin 340 will prevent any turning or slipping of the locking sub-assembly and consequently of the rotor on the hub sub-assembly.

The expansion of locking sub-assembly 300 is due to two effects. First, as the locking sub-assembly rotates the resulting centrifugal force $C_f$ will pull the contacting segments 310 and 312 in the outward direction as shown in the figure, thus expanding the gap and bringing the contacting segments into contact with interior wall 12A of the rotor.

Secondly, the asymmetric C-shape of annular member 302 results in an unbalanced distribution of mass, thus creating an imbalance force $C_m$ which will tend to direct locking sub-assembly 300 toward its heavy side as shown in the figure. Recall that outer surfaces 310A and 312A are raised relative to outer surface 320A. As a result, when the locking sub-assembly is fitted over neck portion 352 of hub sub-assembly 360, a gap is formed between outer surface 320A and interior wall 12A of rotor 10.

As can be seen in FIG. 5B, the gap gives the locking sub-assembly room to move in the direction of imbalance force $C_m$. Consequently, the inner edges at the gap of locking sub-assembly 300 will hit neck portion 352 by this tendency to slide off the drive shaft, thus expanding the gap of the locking sub-assembly. As the locking sub-assembly tends to continue in this direction, the contacting segments will become engaged between the rotor and the hub. When the rotor is brought to a halt, the forces $C_m$ and $C_f$ are no longer present and the locking sub-assembly will spring back to its resting position as shown FIG. 5A.

Locking sub-assembly 300 therefore provides an effective self-locking capability during centrifugation. Conversely when centrifugation ceases, the resiliency of the annular member of the locking sub-assembly creates spring tension which pulls the sub-assembly back into position around neck portion 352, thus providing an automatic unlocking feature. This eliminates the need for a latching mechanism for locking down and unlocking the rotor. Such latching mechanisms require forming a drive hole through the entire length of the rotor, which greatly compromises the structural integrity of the rotor and limits is useful lifetime and/or maximum usable speed. All that is required of the locking mechanism of the present invention is a drive hole sufficient to receive a drive shaft equipped with the locking mechanism. This minimizes the rotor's exposure to stress during centrifugation and thus increases the useful life of the component.

The simplicity of the design of the locking sub-assembly allows existing rotors to be used in newer centrifugation instruments which employ the locking mechanism of the present invention. This represents a significant savings when upgrading to newer instruments.

I claim:

1. A centrifuge rotor lock for securing a rotor to a hub of a drive shaft, said rotor having a drive hole with an interior wall for receiving said hub during centrifugation, the rotor lock comprising:

a C-shaped annular member adapted to have a snap fit relation relative to said hub;

said annular member having opposed outer portions adapted for contacting the interior wall of said drive hole and an outer non-contacting portion disposed between said contacting portions;

said annular member having an opening formed therethrough and a locking pin received in said opening;

whereby said contacting portions become engaged between said hub and said interior wall of said rotor as said annular member is bowed due to forces which arise during centrifugation.

2. The rotor lock of claim 1 wherein said C-shaped annular member further includes a gap at its periphery, said gap adapted to have a width that is smaller than a diameter of said hub, whereby a snap-fit coupling of said locking member to said hub is attained.

3. The rotor lock of claim 1 wherein said contacting portions are disposed upon diametrically opposed segments of said annular member.

4. The rotor lock of claim 1 wherein outer surfaces of said contacting portions are raised relative to the outer surface of said non-contacting portion.

5. The rotor lock of claim 4 wherein the thickness of said annular member at said contacting portions is greater than the thickness of said annular member at said non-contacting portion.

6. The rotor lock of claim 4 wherein said outer surfaces of said contacting portions have a radius measurement greater than a radius measurement of the outer surface of said non-contacting portion.

7. A locking apparatus to fix a centrifuge rotor to a drive hub of a centrifuge drive system during centrifugation, said rotor having a drive hole formed through the underside thereof, said drive hub having a neck portion, the locking apparatus comprising:

a flexible C-shaped collar member having first, second, and third segments disposed about a central axis thereof;

said second segment disposed between said first and third segments;

said first and third segments each having a thickness measurement that is greater than a thickness measurement of said second segment;

one of said first, second and third segments having an opening therethrough; and a locking pin for being received in said opening;

whereby said collar member fits about said neck portion and is received in said drive hole of said rotor during centrifugation;

whereby during centrifugation, centrifugal forces cause said collar member to flex and frictionally engage said rotor thereby transferring a rotational force from said drive system to said rotor;

whereby insertion of said locking pin through said opening and into a corresponding opening in said neck portion enables said collar member to rotate together with said drive hub.

8. The locking apparatus of claim 7 wherein said first and third segments are in diametrically opposed relation to each other.

9. The locking apparatus of claim 7 wherein said C-shaped collar member is adapted so that a gap thereof is less than a diameter of said neck portion by an amount which permits a snap-fit attachment of said collar member to said neck portion.

10. The locking apparatus of claim 7 wherein said segments each have an outer surface, outer surfaces of said first and third segments each having a radius measurement greater than a radius measurement of the outer surface of said second segment.

11. The locking apparatus of claim 10 wherein said outer surfaces of said segments have arcuate profiles.

12. A locking mechanism for a centrifuge rotor, said rotor having a mounting bore formed through the underside thereof, the locking mechanism comprising:

a drive hub for being received in said bore of said rotor;

a generally cylindrical flexible member having a gap formed along an axial direction, said gap being sufficiently wide to allow a snap-fit engagement of said cylindrical member onto said drive hub, said cylindrical member having an enlarged segment proximate each side of said gap; and a locking pin;

said drive hub including an opening formed therein for receiving said locking pin;

said cylindrical member including a passageway coincident with said opening for receiving said locking pin;

whereby said cylindrical member is rendered substantially stationary relative to said drive hub when said cylindrical member is snap-fitted onto said drive hub and said locking pin is received in said openings through said passageway;

whereby said enlarged segments become engaged between the drive hub and the rotor as the cylindrical member flexes during centrifugation.

13. The locking mechanism of claim 12 wherein outer surfaces of said enlarged segments are raised relative to the outer surface of the remaining portion of said cylindrical member.

14. The locking mechanism of claim 12 wherein the radial distance to the outer surface of each enlarged segment is greater than the radial distance to the outer surface of the remaining portion of said cylindrical member.

15. A centrifuge rotor assembly comprising:

a rotor having on the underside thereof an axially disposed bore;

a drive hub;

an annular rotor locking member coupled to said drive hub, said locking member having a C shape, said locking member having opposed contacting portions for contacting the interior wall of said axial bore, and a non-contacting portion disposed between said contacting portions; and a locking pin;

said locking member and said drive hub having openings in alignment with each other for receiving portions of said locking pin;

whereby said contacting portions become locked between said drive hub and the interior wall of said rotor due to forces which arise during centrifugation.

16. The assembly of claim 15 wherein the opening of said C shape of said locking member is smaller than the diameter of said drive hub thus providing a snap-fit coupling of said locking member to said drive hub.

17. The assembly of claim 15 wherein said contacting portions are located at diametrically opposed positions of said annular member.

* * * * *